(12) United States Patent
Wang et al.

(10) Patent No.: US 9,610,685 B2
(45) Date of Patent: Apr. 4, 2017

(54) GRAPHICAL INTERFACE FOR A REMOTE PRESENCE SYSTEM

(75) Inventors: Yulun Wang, Goleta, CA (US); Charles S. Jordan, Santa Barbara, CA (US); Jonathan Southard, Santa Barbara, CA (US); Marco Pinter, Santa Barbara, CA (US)

(73) Assignee: INTOUCH TECHNOLOGIES, INC., Goleta, CA (US)

( * ) Notice: Subject to any disclaimer, the term of this patent is extended or adjusted under 35 U.S.C. 154(b) by 424 days.

(21) Appl. No.: 12/685,986

(22) Filed: Jan. 12, 2010

(65) Prior Publication Data

US 2010/0115418 A1    May 6, 2010

Related U.S. Application Data

(63) Continuation of application No. 10/962,829, filed on Oct. 11, 2004.

(60) Provisional application No. 60/548,561, filed on Feb. 26, 2004.

(51) Int. Cl.
  *G06F 19/00*  (2011.01)
  *B25J 5/00*   (2006.01)
  *B25J 9/16*   (2006.01)
  *B25J 11/00*  (2006.01)

(52) U.S. Cl.
  CPC ............... *B25J 5/00* (2013.01); *B25J 9/1689* (2013.01); *B25J 11/009* (2013.01)

(58) Field of Classification Search
  CPC ........... B25J 5/00; B25J 9/1686; B25J 11/009
  USPC ....... 700/245, 246, 250, 254, 259, 260, 261, 700/262; 318/568.12; 901/1; 702/188; 715/230, 700, 753, 833, 846, 977; 345/418, 676
  See application file for complete search history.

(56) References Cited

U.S. PATENT DOCUMENTS

| | | |
|---|---|---|
| 3,821,995 A | 7/1974 | Aghnides |
| 4,413,693 A | 11/1983 | Derby |
| 4,471,354 A | 9/1984 | Smith |
| 4,519,466 A | 5/1985 | Shiraishi |
| 4,638,445 A | 1/1987 | Mattaboni |
| 4,669,168 A | 6/1987 | Tamura et al. |
| 4,697,472 A | 10/1987 | Hiyane |
| 4,709,265 A | 11/1987 | Silverman et al. |
| 4,733,737 A | 3/1988 | Falamak |
| 4,751,658 A | 6/1988 | Kadonoff et al. |

(Continued)

FOREIGN PATENT DOCUMENTS

| | | |
|---|---|---|
| CA | 2289697 A1 | 11/1998 |
| CN | 101978365 A | 2/2011 |

(Continued)

OTHER PUBLICATIONS

"Inventing the Future: 2000 Years of Discovery", Discovery Channel Canada (VideoTranscript), Jan. 2, 2000.

(Continued)

*Primary Examiner* — Jaime Figueroa (57) ABSTRACT

A robot system that includes a robot and a remote station. The remote station may be a personal computer coupled to the robot through a broadband network. A user at the remote station may receive both video and audio from a camera and microphone of the robot, respectively. The remote station may include a display user interface that has a variety of viewable fields and selectable buttons.

20 Claims, 6 Drawing Sheets

(56) References Cited

U.S. PATENT DOCUMENTS

| | | |
|---|---|---|
| 4,777,416 A | 10/1988 | George et al. |
| 4,797,557 A | 1/1989 | Ohman |
| 4,803,625 A | 2/1989 | Fu et al. |
| 4,847,764 A | 7/1989 | Halvorson |
| 4,875,172 A | 10/1989 | Kanayama |
| 4,942,512 A | 7/1990 | Kohno |
| 4,953,159 A | 8/1990 | Hayden et al. |
| 4,974,607 A | 12/1990 | Miwa |
| 4,977,971 A | 12/1990 | Crane et al. |
| 5,006,988 A | 4/1991 | Borenstein et al. |
| 5,040,116 A | 8/1991 | Evans et al. |
| 5,051,906 A | 9/1991 | Evans et al. |
| 5,073,749 A | 12/1991 | Kanayama |
| 5,084,828 A | 1/1992 | Kaufman et al. |
| 5,130,794 A | 7/1992 | Ritchey |
| 5,153,833 A | 10/1992 | Gordon et al. |
| 5,155,684 A | 10/1992 | Burke et al. |
| 5,157,491 A | 10/1992 | Kassatly |
| 5,182,641 A | 1/1993 | Diner et al. |
| 5,186,270 A | 2/1993 | West |
| 5,193,143 A | 3/1993 | Kaemmerer et al. |
| 5,217,453 A | 6/1993 | Wilk |
| 5,224,157 A | 6/1993 | Yamada et al. |
| 5,236,432 A | 8/1993 | Matsen, III et al. |
| 5,305,427 A | 4/1994 | Nagata |
| 5,315,287 A | 5/1994 | Sol |
| 5,319,611 A | 6/1994 | Korba |
| 5,341,242 A | 8/1994 | Gilboa et al. |
| 5,341,854 A | 8/1994 | Zezulka et al. |
| 5,347,457 A | 9/1994 | Tanaka et al. |
| 5,366,896 A | 11/1994 | Margrey et al. |
| 5,374,879 A | 12/1994 | Pin et al. |
| 5,413,693 A | 5/1995 | Redepenning |
| 5,419,008 A | 5/1995 | West |
| 5,436,542 A | 7/1995 | Petelin et al. |
| 5,441,047 A | 8/1995 | David et al. |
| 5,442,728 A | 8/1995 | Kaufman et al. |
| 5,462,051 A | 10/1995 | Oka et al. |
| 5,486,853 A | 1/1996 | Baxter et al. |
| 5,510,832 A | 4/1996 | Garcia |
| 5,539,741 A | 7/1996 | Barraclough et al. |
| 5,544,649 A | 8/1996 | David et al. |
| 5,553,609 A | 9/1996 | Chen et al. |
| 5,572,229 A | 11/1996 | Fisher |
| 5,594,859 A | 1/1997 | Palmer et al. |
| 5,630,566 A | 5/1997 | Case |
| 5,636,218 A | 6/1997 | Ishikawa et al. |
| 5,682,199 A | 10/1997 | Lankford |
| 5,684,695 A | 11/1997 | Bauer |
| 5,701,904 A | 12/1997 | Simmons et al. |
| 5,739,657 A | 4/1998 | Takayama et al. |
| 5,762,458 A | 6/1998 | Wang et al. |
| 5,767,897 A | 6/1998 | Howell |
| 5,786,846 A | 7/1998 | Hiroaki |
| 5,802,494 A * | 9/1998 | Kuno ................. 705/2 |
| 5,836,872 A | 11/1998 | Kenet |
| 5,838,575 A | 11/1998 | Lion |
| 5,857,534 A | 1/1999 | DeVault et al. |
| 5,867,653 A | 2/1999 | Aras et al. |
| 5,871,451 A | 2/1999 | Unger et al. |
| 5,876,325 A | 3/1999 | Mizuno et al. |
| 5,911,036 A | 6/1999 | Wright et al. |
| 5,917,958 A | 6/1999 | Nunally et al. |
| 5,927,423 A | 7/1999 | Wada et al. |
| 5,949,758 A | 9/1999 | Kober |
| 5,954,692 A | 9/1999 | Smith et al. |
| 5,959,423 A | 9/1999 | Nakanishi et al. |
| 5,966,130 A | 10/1999 | Benman |
| 5,974,446 A | 10/1999 | Sonnenreich et al. |
| 5,995,884 A | 11/1999 | Allen et al. |
| 6,006,946 A | 12/1999 | Williams et al. |
| 6,036,812 A | 3/2000 | Williams et al. |
| 6,133,944 A | 10/2000 | Braun |
| 6,135,228 A | 10/2000 | Asada et al. |
| 6,148,100 A | 11/2000 | Anderson et al. |
| 6,170,929 B1 | 1/2001 | Wilson et al. |
| 6,175,779 B1 | 1/2001 | Barrett |
| 6,211,903 B1 | 4/2001 | Bullister |
| 6,219,587 B1 | 4/2001 | Ahlin et al. |
| 6,232,735 B1 | 5/2001 | Baba et al. |
| 6,233,504 B1 | 5/2001 | Das et al. |
| 6,256,556 B1 | 7/2001 | Zenke |
| 6,259,806 B1 | 7/2001 | Green |
| 6,266,162 B1 | 7/2001 | Okamura et al. |
| 6,266,577 B1 | 7/2001 | Popp et al. |
| 6,289,263 B1 | 9/2001 | Mukherjee |
| 6,292,713 B1 | 9/2001 | Jouppi et al. |
| 6,304,050 B1 | 10/2001 | Skaar et al. |
| 6,321,137 B1 | 11/2001 | De Smet |
| 6,325,756 B1 | 12/2001 | Webb et al. |
| 6,330,486 B1 | 12/2001 | Padula |
| 6,330,493 B1 | 12/2001 | Takahashi et al. |
| 6,346,950 B1 | 2/2002 | Jouppi |
| 6,346,962 B1 | 2/2002 | Goodridge |
| 6,369,847 B1 | 4/2002 | James et al. |
| 6,381,515 B1 | 4/2002 | Inoue et al. |
| 6,408,230 B2 | 6/2002 | Wada |
| 6,430,471 B1 | 8/2002 | Kintou et al. |
| 6,430,475 B2 | 8/2002 | Okamoto |
| 6,438,457 B1 | 8/2002 | Yokoo |
| 6,452,915 B1 | 9/2002 | Jorgensen |
| 6,457,043 B1 | 9/2002 | Kwak et al. |
| 6,459,955 B1 | 10/2002 | Bartsch et al. |
| 6,463,352 B1 | 10/2002 | Tadokoro et al. |
| 6,463,361 B1 | 10/2002 | Wang |
| 6,466,844 B1 | 10/2002 | Ikeda et al. |
| 6,468,265 B1 | 10/2002 | Evans et al. |
| 6,474,434 B1 | 11/2002 | Bech |
| 6,491,701 B2 | 12/2002 | Tierney |
| 6,496,099 B2 | 12/2002 | Wang et al. |
| 6,496,755 B2 | 12/2002 | Wallach et al. |
| 6,501,740 B1 | 12/2002 | Sun et al. |
| 6,507,773 B2 | 1/2003 | Parker et al. |
| 6,522,906 B1 | 2/2003 | Salisbury et al. |
| 6,523,629 B1 | 2/2003 | Buttz et al. |
| 6,526,332 B2 | 2/2003 | Sakamoto et al. |
| 6,529,765 B1 | 3/2003 | Franck |
| 6,529,802 B1 | 3/2003 | Kawakita et al. |
| 6,532,404 B2 | 3/2003 | Colens |
| 6,535,182 B2 | 3/2003 | Stanton |
| 6,535,793 B2 * | 3/2003 | Allard ................. 700/259 |
| 6,540,039 B1 | 4/2003 | Yu |
| 6,543,899 B2 | 4/2003 | Covannon et al. |
| 6,549,215 B2 | 4/2003 | Jouppi |
| 6,563,533 B1 | 5/2003 | Colby |
| 6,580,246 B2 | 6/2003 | Jacobs |
| 6,581,798 B2 | 6/2003 | Liff et al. |
| 6,587,750 B2 | 7/2003 | Gerbi et al. |
| 6,594,552 B1 | 7/2003 | Gerbi et al. |
| 6,604,019 B2 | 8/2003 | Ahlin et al. |
| 6,604,021 B2 | 8/2003 | Imai et al. |
| 6,611,120 B2 | 8/2003 | Song et al. |
| 6,646,677 B2 | 11/2003 | Noro et al. |
| 6,666,374 B1 | 12/2003 | Green et al. |
| 6,684,129 B2 | 1/2004 | Salisbury et al. |
| 6,691,000 B2 | 2/2004 | Nagai et al. |
| 6,710,797 B1 | 3/2004 | McNelley et al. |
| 6,728,599 B2 | 4/2004 | Wright et al. |
| 6,763,282 B2 | 7/2004 | Glenn et al. |
| 6,764,373 B1 | 7/2004 | Osawa et al. |
| 6,781,606 B2 | 8/2004 | Jouppi et al. |
| 6,784,916 B2 | 8/2004 | Smith |
| 6,785,589 B2 | 8/2004 | Eggenberger et al. |
| 6,798,753 B1 | 9/2004 | Doganata et al. |
| 6,799,065 B1 | 9/2004 | Niemeyer |
| 6,799,088 B2 | 9/2004 | Wang et al. |
| 6,804,656 B1 | 10/2004 | Rosenfeld et al. |
| 6,836,703 B2 | 12/2004 | Wang et al. |
| 6,839,612 B2 | 1/2005 | Sanchez et al. |
| 6,840,904 B2 | 1/2005 | Goldberg |
| 6,845,297 B2 | 1/2005 | Allard |
| 6,852,107 B2 | 2/2005 | Wang et al. |
| 6,853,878 B2 | 2/2005 | Hirayama et al. |
| 6,853,880 B2 | 2/2005 | Sakagami et al. |

(56) References Cited

U.S. PATENT DOCUMENTS

| | | | |
|---|---|---|---|
| 6,871,117 B2 | 3/2005 | Wang et al. | |
| 6,879,879 B2 | 4/2005 | Jouppi et al. | |
| 6,892,112 B2 | 5/2005 | Wang et al. | |
| 6,895,305 B2 | 5/2005 | Lathan et al. | |
| 6,898,484 B2 | 5/2005 | Lemelson et al. | |
| 6,914,622 B1 | 7/2005 | Smith et al. | |
| 6,925,357 B2 | 8/2005 | Wang et al. | |
| 6,958,706 B2 | 10/2005 | Chaco et al. | |
| 6,995,664 B1 | 2/2006 | Darling | |
| 7,030,757 B2 | 4/2006 | Matsuhira et al. | |
| 7,058,689 B2 | 6/2006 | Parker et al. | |
| 7,092,001 B2 | 8/2006 | Schulz | |
| 7,115,102 B2 | 10/2006 | Abbruscato | |
| 7,117,067 B2 | 10/2006 | McLurkin et al. | |
| 7,123,285 B2 * | 10/2006 | Smith et al. | 348/14.05 |
| 7,123,974 B1 | 10/2006 | Hamilton | |
| 7,129,970 B2 | 10/2006 | James et al. | |
| 7,133,062 B2 | 11/2006 | Castles et al. | |
| 7,142,945 B2 | 11/2006 | Wang et al. | |
| 7,142,947 B2 | 11/2006 | Wang et al. | |
| 7,151,982 B2 | 12/2006 | Liff et al. | |
| 7,154,526 B2 * | 12/2006 | Foote et al. | 348/14.08 |
| 7,155,306 B2 | 12/2006 | Haitin et al. | |
| 7,156,809 B2 | 1/2007 | Quy | |
| 7,158,859 B2 | 1/2007 | Wang et al. | |
| 7,158,860 B2 | 1/2007 | Wang et al. | |
| 7,161,322 B2 | 1/2007 | Wang et al. | |
| 7,162,338 B2 | 1/2007 | Goncalves et al. | |
| 7,164,969 B2 | 1/2007 | Wang et al. | |
| 7,171,286 B2 | 1/2007 | Wang et al. | |
| 7,174,238 B1 | 2/2007 | Zweig | |
| 7,184,559 B2 | 2/2007 | Jouppi | |
| 7,188,000 B2 | 3/2007 | Chiappetta et al. | |
| 7,199,790 B2 | 4/2007 | Rosenberg et al. | |
| 7,202,851 B2 | 4/2007 | Cunningham et al. | |
| 7,206,627 B2 | 4/2007 | Abovitz et al. | |
| 7,215,786 B2 | 5/2007 | Nakadai et al. | |
| 7,227,334 B2 | 6/2007 | Yang et al. | |
| 7,256,708 B2 | 8/2007 | Rosenfeld et al. | |
| 7,262,573 B2 | 8/2007 | Wang et al. | |
| 7,289,883 B2 | 10/2007 | Wang et al. | |
| 7,292,912 B2 * | 11/2007 | Wang et al. | 700/259 |
| 7,321,807 B2 | 1/2008 | Laski | |
| 7,346,429 B2 | 3/2008 | Goldenberg et al. | |
| 7,432,949 B2 | 10/2008 | Remy et al. | |
| 7,441,953 B2 | 10/2008 | Banks | |
| 7,525,281 B2 | 4/2009 | Koyanagi et al. | |
| 7,535,486 B2 | 5/2009 | Motomura et al. | |
| 7,593,030 B2 | 9/2009 | Wang et al. | |
| 7,624,166 B2 | 11/2009 | Foote et al. | |
| 7,719,229 B2 | 5/2010 | Kaneko et al. | |
| 7,761,185 B2 | 7/2010 | Wang et al. | |
| 7,769,492 B2 | 8/2010 | Wang et al. | |
| 7,813,836 B2 | 10/2010 | Wang et al. | |
| 7,835,775 B2 | 11/2010 | Sawayama et al. | |
| RE42,288 E | 4/2011 | Degioanni | |
| 8,077,963 B2 | 12/2011 | Wang et al. | |
| 8,116,910 B2 | 2/2012 | Walters et al. | |
| 8,170,241 B2 | 5/2012 | Roe et al. | |
| 8,179,418 B2 | 5/2012 | Wright et al. | |
| 8,209,051 B2 | 6/2012 | Wang et al. | |
| 2001/0002448 A1 | 5/2001 | Wilson et al. | |
| 2001/0010053 A1 | 7/2001 | Ben-Shachar et al. | |
| 2001/0034475 A1 | 10/2001 | Flach et al. | |
| 2001/0034544 A1 * | 10/2001 | Mo | 607/59 |
| 2001/0037163 A1 | 11/2001 | Allard | |
| 2001/0051881 A1 | 12/2001 | Filler | |
| 2001/0054071 A1 * | 12/2001 | Loeb | 709/205 |
| 2001/0055373 A1 | 12/2001 | Yamashita | |
| 2002/0015296 A1 | 2/2002 | Howell et al. | |
| 2002/0027597 A1 | 3/2002 | Sachau | |
| 2002/0049517 A1 | 4/2002 | Ruffner | |
| 2002/0055917 A1 | 5/2002 | Muraca | |
| 2002/0057279 A1 | 5/2002 | Jouppi | |
| 2002/0058929 A1 | 5/2002 | Green | |
| 2002/0059587 A1 | 5/2002 | Cofano et al. | |
| 2002/0063726 A1 | 5/2002 | Jouppi | |
| 2002/0073429 A1 | 6/2002 | Beane et al. | |
| 2002/0095238 A1 | 7/2002 | Ahlin et al. | |
| 2002/0098879 A1 | 7/2002 | Rheey | |
| 2002/0104094 A1 | 8/2002 | Alexander et al. | |
| 2002/0111988 A1 | 8/2002 | Sato | |
| 2002/0120362 A1 * | 8/2002 | Lathan et al. | 700/245 |
| 2002/0130950 A1 * | 9/2002 | James et al. | 348/14.08 |
| 2002/0141595 A1 * | 10/2002 | Jouppi | 381/2 |
| 2002/0143923 A1 | 10/2002 | Alexander | |
| 2002/0177925 A1 | 11/2002 | Onishi et al. | |
| 2002/0183894 A1 | 12/2002 | Wang | |
| 2002/0184674 A1 | 12/2002 | Xi et al. | |
| 2002/0186243 A1 | 12/2002 | Ellis et al. | |
| 2003/0030397 A1 | 2/2003 | Simmons | |
| 2003/0048481 A1 | 3/2003 | Kobayashi et al. | |
| 2003/0050733 A1 | 3/2003 | Wang et al. | |
| 2003/0060808 A1 | 3/2003 | Wilk | |
| 2003/0069752 A1 | 4/2003 | Ledain et al. | |
| 2003/0100892 A1 | 5/2003 | Morley et al. | |
| 2003/0114962 A1 | 6/2003 | Niemeyer | |
| 2003/0135203 A1 | 7/2003 | Wang et al. | |
| 2003/0144579 A1 | 7/2003 | Buss | |
| 2003/0144649 A1 | 7/2003 | Ghodoussi et al. | |
| 2003/0151658 A1 | 8/2003 | Smith | |
| 2003/0171710 A1 | 9/2003 | Bassuk et al. | |
| 2003/0180697 A1 | 9/2003 | Kim et al. | |
| 2003/0199000 A1 | 10/2003 | Valkirs et al. | |
| 2003/0220541 A1 | 11/2003 | Salisbury et al. | |
| 2003/0231244 A1 | 12/2003 | Bonilla et al. | |
| 2003/0232649 A1 | 12/2003 | Gizis et al. | |
| 2004/0010344 A1 | 1/2004 | Hiratsuka et al. | |
| 2004/0019406 A1 | 1/2004 | Wang et al. | |
| 2004/0024490 A1 | 2/2004 | McLurkin et al. | |
| 2004/0065073 A1 | 4/2004 | Nash | |
| 2004/0068657 A1 | 4/2004 | Alexander et al. | |
| 2004/0078219 A1 | 4/2004 | Kaylor et al. | |
| 2004/0088077 A1 | 5/2004 | Jouppi et al. | |
| 2004/0093409 A1 | 5/2004 | Thompson et al. | |
| 2004/0098167 A1 | 5/2004 | Yi et al. | |
| 2004/0102167 A1 | 5/2004 | Shim et al. | |
| 2004/0117065 A1 | 6/2004 | Wang et al. | |
| 2004/0138547 A1 | 7/2004 | Wang et al. | |
| 2004/0143421 A1 | 7/2004 | Wang et al. | |
| 2004/0148638 A1 | 7/2004 | Weisman et al. | |
| 2004/0153211 A1 | 8/2004 | Kamoto et al. | |
| 2004/0157612 A1 | 8/2004 | Kim | |
| 2004/0162637 A1 | 8/2004 | Wang et al. | |
| 2004/0167666 A1 | 8/2004 | Wang et al. | |
| 2004/0167668 A1 | 8/2004 | Wang et al. | |
| 2004/0170300 A1 | 9/2004 | Jouppi | |
| 2004/0172301 A1 | 9/2004 | Mihai et al. | |
| 2004/0174129 A1 | 9/2004 | Wang et al. | |
| 2004/0175684 A1 | 9/2004 | Kaasa et al. | |
| 2004/0179714 A1 | 9/2004 | Jouppi | |
| 2004/0189700 A1 | 9/2004 | Mandavilli et al. | |
| 2004/0201602 A1 | 10/2004 | Mody et al. | |
| 2004/0215490 A1 | 10/2004 | Duchon et al. | |
| 2004/0241981 A1 | 12/2004 | Doris et al. | |
| 2005/0003330 A1 | 1/2005 | Asgarinejad et al. | |
| 2005/0007445 A1 | 1/2005 | Foote et al. | |
| 2005/0021182 A1 | 1/2005 | Wang et al. | |
| 2005/0021183 A1 | 1/2005 | Wang et al. | |
| 2005/0021187 A1 | 1/2005 | Wang et al. | |
| 2005/0021309 A1 | 1/2005 | Alexander et al. | |
| 2005/0024485 A1 | 2/2005 | Castles et al. | |
| 2005/0027567 A1 | 2/2005 | Taha | |
| 2005/0027794 A1 | 2/2005 | Decker | |
| 2005/0028221 A1 | 2/2005 | Liu et al. | |
| 2005/0035862 A1 | 2/2005 | Wildman et al. | |
| 2005/0038416 A1 | 2/2005 | Wang et al. | |
| 2005/0038564 A1 | 2/2005 | Burick | |
| 2005/0052527 A1 | 3/2005 | Remy et al. | |
| 2005/0065435 A1 | 3/2005 | Rauch et al. | |
| 2005/0065438 A1 | 3/2005 | Miller | |
| 2005/0065659 A1 | 3/2005 | Tanaka et al. | |
| 2005/0065813 A1 | 3/2005 | Mishelevich et al. | |
| 2005/0071046 A1 | 3/2005 | Miyazaki et al. | |

(56) References Cited

U.S. PATENT DOCUMENTS

| | | |
|---|---|---|
| 2005/0083011 A1 | 4/2005 | Yang et al. |
| 2005/0110867 A1 | 5/2005 | Schulz |
| 2005/0122390 A1* | 6/2005 | Wang et al. ............... 348/14.1 |
| 2005/0154265 A1 | 7/2005 | Miro et al. |
| 2005/0182322 A1 | 8/2005 | Grispo |
| 2005/0192721 A1 | 9/2005 | Jouppi |
| 2005/0204438 A1 | 9/2005 | Wang et al. |
| 2005/0212478 A1 | 9/2005 | Takenaka |
| 2005/0219356 A1 | 10/2005 | Smith et al. |
| 2005/0225634 A1 | 10/2005 | Brunetti et al. |
| 2005/0231156 A1 | 10/2005 | Yan |
| 2005/0232647 A1 | 10/2005 | Takenaka |
| 2005/0267826 A1 | 12/2005 | Levy et al. |
| 2005/0283414 A1 | 12/2005 | Fernandes et al. |
| 2006/0007943 A1 | 1/2006 | Fellman |
| 2006/0013263 A1 | 1/2006 | Fellman |
| 2006/0013469 A1 | 1/2006 | Wang et al. |
| 2006/0013488 A1 | 1/2006 | Inoue |
| 2006/0029065 A1 | 2/2006 | Fellman |
| 2006/0047365 A1 | 3/2006 | Ghodoussi et al. |
| 2006/0048286 A1 | 3/2006 | Donato |
| 2006/0052676 A1 | 3/2006 | Wang et al. |
| 2006/0052684 A1 | 3/2006 | Takahashi et al. |
| 2006/0064212 A1 | 3/2006 | Thorne |
| 2006/0082642 A1 | 4/2006 | Wang et al. |
| 2006/0087746 A1 | 4/2006 | Lipow |
| 2006/0095170 A1 | 5/2006 | Yang et al. |
| 2006/0098573 A1 | 5/2006 | Beer et al. |
| 2006/0103659 A1 | 5/2006 | Karandikar et al. |
| 2006/0104279 A1 | 5/2006 | Fellman et al. |
| 2006/0106493 A1 | 5/2006 | Niemeyer et al. |
| 2006/0122482 A1 | 6/2006 | Mariotti et al. |
| 2006/0142983 A1 | 6/2006 | Sorensen et al. |
| 2006/0161303 A1 | 7/2006 | Wang et al. |
| 2006/0173712 A1 | 8/2006 | Joubert |
| 2006/0178776 A1 | 8/2006 | Feingold et al. |
| 2006/0189393 A1 | 8/2006 | Edery |
| 2006/0195569 A1 | 8/2006 | Barker |
| 2006/0259193 A1 | 11/2006 | Wang et al. |
| 2006/0293788 A1 | 12/2006 | Pogodin |
| 2007/0021871 A1 | 1/2007 | Wang et al. |
| 2007/0046237 A1 | 3/2007 | Lakshmanan et al. |
| 2007/0050937 A1 | 3/2007 | Song et al. |
| 2007/0064092 A1 | 3/2007 | Sandbeg et al. |
| 2007/0120965 A1 | 5/2007 | Sandberg et al. |
| 2007/0122783 A1 | 5/2007 | Habashi |
| 2007/0135967 A1 | 6/2007 | Jung et al. |
| 2007/0142964 A1 | 6/2007 | Abramson |
| 2007/0192910 A1 | 8/2007 | Vu et al. |
| 2007/0197896 A1 | 8/2007 | Moll et al. |
| 2007/0198128 A1 | 8/2007 | Ziegler et al. |
| 2007/0199108 A1 | 8/2007 | Angle et al. |
| 2007/0216347 A1 | 9/2007 | Kaneko et al. |
| 2007/0250212 A1 | 10/2007 | Halloran et al. |
| 2007/0262884 A1 | 11/2007 | Goncalves et al. |
| 2007/0273751 A1 | 11/2007 | Sachau |
| 2007/0291109 A1 | 12/2007 | Wang et al. |
| 2008/0011904 A1 | 1/2008 | Cepollina et al. |
| 2008/0082211 A1 | 4/2008 | Wang et al. |
| 2008/0133052 A1 | 6/2008 | Jones et al. |
| 2008/0215987 A1 | 9/2008 | Alexander et al. |
| 2008/0229531 A1 | 9/2008 | Takida |
| 2008/0263451 A1* | 10/2008 | Portele et al. ............... 715/727 |
| 2008/0269949 A1 | 10/2008 | Norman et al. |
| 2009/0030552 A1 | 1/2009 | Nakadai et al. |
| 2009/0125147 A1 | 5/2009 | Wang et al. |
| 2009/0237317 A1 | 9/2009 | Rofougaran |
| 2010/0076600 A1 | 3/2010 | Cross et al. |
| 2010/0116566 A1 | 5/2010 | Ohm et al. |
| 2010/0191375 A1 | 7/2010 | Wright et al. |
| 2010/0323783 A1 | 12/2010 | Nonaka et al. |
| 2011/0172822 A1 | 7/2011 | Ziegler et al. |
| 2011/0187875 A1 | 8/2011 | Sanchez et al. |
| 2011/0190930 A1 | 8/2011 | Hanrahan et al. |
| 2011/0218674 A1 | 9/2011 | Stuart et al. |
| 2011/0245973 A1 | 10/2011 | Wang et al. |
| 2011/0301759 A1 | 12/2011 | Wang et al. |
| 2012/0023506 A1 | 1/2012 | Maeckel et al. |
| 2012/0072023 A1 | 3/2012 | Ota |
| 2012/0092157 A1 | 4/2012 | Tran |

FOREIGN PATENT DOCUMENTS

| | | |
|---|---|---|
| CN | 102203759 A | 9/2011 |
| EP | 466492 A2 | 1/1992 |
| EP | 981905 B1 | 1/2002 |
| EP | 1262142 A2 | 12/2002 |
| EP | 1536660 A2 | 6/2005 |
| EP | 2005/1594660 A2 | 11/2005 |
| EP | 1536660 A3 | 4/2008 |
| EP | 2011/2342651 A2 | 7/2011 |
| JP | 7213753 A | 8/1995 |
| JP | 7248823 A | 9/1995 |
| JP | 7257422 A | 10/1995 |
| JP | 8084328 A | 3/1996 |
| JP | 8320727 A | 12/1996 |
| JP | 9267276 A | 10/1997 |
| JP | 10079097 A | 3/1998 |
| JP | 10288689 A | 10/1998 |
| JP | 200032319 A | 1/2000 |
| JP | 2000049800 A | 2/2000 |
| JP | 2000079587 A | 3/2000 |
| JP | 2000196876 A | 7/2000 |
| JP | 2001147718 A | 5/2001 |
| JP | 2001198865 A | 7/2001 |
| JP | 2001198868 A | 7/2001 |
| JP | 2001199356 A | 7/2001 |
| JP | 2002000574 A | 1/2002 |
| JP | 2002046088 A | 2/2002 |
| JP | 2002/112970 A | 4/2002 |
| JP | 2002/101333 A | 5/2002 |
| JP | 2002305743 A | 10/2002 |
| JP | 2355779 A | 12/2002 |
| JP | 2004/289379 A | 10/2004 |
| JP | 2005028066 A | 2/2005 |
| JP | 2005/059170 A | 3/2005 |
| JP | 2006/508806 A | 3/2006 |
| JP | 2006/109094 A | 4/2006 |
| JP | 2006/224294 A | 8/2006 |
| JP | 2006/246438 A | 9/2006 |
| JP | 2007/081646 A | 3/2007 |
| KR | 2009/0012542 A | 2/2009 |
| WO | 9306690 | 4/1993 |
| WO | 9851078 A1 | 11/1998 |
| WO | 9967067 A1 | 12/1999 |
| WO | 0033726 A1 | 6/2000 |
| WO | 03077745 A1 | 9/2003 |
| WO | 2004/012018 A2 | 2/2004 |
| WO | 2004075456 A2 | 9/2004 |
| WO | 2006/012797 A1 | 2/2006 |
| WO | 2006/078611 A1 | 4/2006 |
| WO | 2006044847 A2 | 4/2006 |
| WO | 2007/041295 A2 | 4/2007 |
| WO | 2007041295 A1 | 4/2007 |
| WO | 2007/041038 A1 | 6/2007 |
| WO | 2008/100272 A2 | 8/2008 |
| WO | 2008/100272 A3 | 10/2008 |
| WO | 2009/117274 A2 | 9/2009 |
| WO | 2009/128997 A1 | 10/2009 |
| WO | 2009/145958 A2 | 12/2009 |
| WO | 2010/006205 A1 | 1/2010 |
| WO | 2010/006211 A1 | 1/2010 |
| WO | 2010/047881 A1 | 4/2010 |
| WO | 2010/062798 A1 | 6/2010 |
| WO | 2010/065257 A1 | 6/2010 |
| WO | 2011/028589 A3 | 4/2011 |
| WO | 2011/097130 A2 | 8/2011 |

(56) References Cited

FOREIGN PATENT DOCUMENTS

| WO | 2011/097132 A2 | 8/2011 |
|---|---|---|
| WO | 2011/109336 A2 | 9/2011 |

OTHER PUBLICATIONS

"ITU-T H.323 Packet-based multimedia communications", ITU, http://www,itu.inurecIT-REC-H.323-199802-Sen, Feb. 1998.
"Mobile Robotics Research Group", Internet Edinburgh 2000, pp. 1-2.
"National Energy Research Scientific Computing Center, Berkeley Lab's RAGE Telepresence Robot Captures R&D100 Award", http://www.nersc.gov/news/newsroom/Page070202.php, Jul. 2, 2002.
"Nomad XR4000 Hardware Manual", Nomadic Technologies, Inc., Mar. 1999.
"Spawar Systems Center "Robart, San Diego, CA, http://web.archive.org/web/*/http://www.nosc.millrobotslland/robartlrobart.html http://web.archive.org/web/19981202205636/http://www.nosc.millrobotslland/robart/robart.html, 1998.
Hees, William P., "Communications Design for a Remote Presence Robot", Jan. 14, 2002.
Al-Kassab, "A Review of Telemedicine", Journal of Telemedicine and Telecare, vol. 5, Supplement 1,1999.
Android Amusement Corp., "What Marketing Secret Renting Robots from Android Amusement Corp", (Advertisement) 1982.
Applebome, "Planning Domesticated Robots for Tomorrow's Household", New York Times; http://www.theoldrobots.com/images17/dc17.JPG, Mar. 4, 1982, pp. 21 and 23.
Baltus, et al., "Towards Personal Service Robots for the Elderly, Proceedings for the Elderly Workshop on Interactive Robots and Entertainment", Computer Science and Robotics 2000.
Bar-Cohen, et al., "Virtual reality robotic telesurgery simulations using MEMICA haptic system,", Internet Mar. 5, 2001, pp. 1-7.
Bartholomew, "An Apothecary's Pharmacy", http://classes.bnf.fr/ema/grands/034.htm, pp. 1230-1240.
Holmberg, "Development of a Holonomic Mobile Robot for Mobile Manipulation Tasks", International Conference on Field and Service Robotics, Pittsburgh, PA, Aug. 1999.
Bauer, et al., "Remote telesurgical mentoring: feasibility and efficacy", IEEE 2000 , pp. 1-9.
Bauer, et al., "Service Robots in Health Care: The Evolution of Mechanical Solutions to Human Resource Problems", Jun. 2003.
Bischoff, "Design Concept and Realization of the Humanoid Service Robot Hermes", Field and Service Robotics, Springer London 1998, pp. 485-492.
Blackwell, Gerry, "Video: A Wireless LAN Killer App?", Internet, Apr. 16, 2002 , pp. 1-3.
Breslow, et al., "Effect of a multiple-site intensive care unit telemedicine program on clinical and economic outcome an alternative paradigm for intensivist staffing", Critical Care Med; vol. 32, No. 1, Jan. 2004, pp. 31-38.
Brooks, Rodney, "Remote Presence", Abstracts from Flesh & Machines, How Robots Will Change Us, Feb. 2002, pp. 131-147.
Candelas, et al., "Flexible virtual and remote laboratory for teaching Robotics", FORMATEX 2006; Proc. Advance in Control Education Madrid, Spain, Jun. 2006, pp. 21-23.
Celt, et al., "The EICU: It's not just telemedicine", Critical Care Medicine vol. 29, No. 8 (Supplement), Aug. 2001.
Cheetham, et al., "Interface Development for a Child's Video Conferencing Robot", 2000, pp. 1-4.
Cleary, et al., "State of the art in surgical robotics: Clinical applications and technology challenges", Internet, Feb. 24, 2002 , pp. 1-26.
CNN, "Floating 'droids' to roam space corridors of the future", Internet, Jan. 12, 2000 , pp. 1-4.
Cnn.com/Technology, "Paging R.Robot: Machine helps doctors with patients", Internet, Sep. 30, 2003, pp. 1-3.
Crowley, "Hello to Our Future", AARP Bulletin, http://www.cs.cmu.ed/-nursebouweb/press/aarp 99 14/millennium.html, Jan. 2000.
Dalton, "Techniques for Web Telerobotics", PhD Thesis, University of Western Australia, http://telerobot.mech.uwa.edu.au/information.html,http://cataloQue.library.uwa.edu.au/search 2001, pp. 27-62 149-191.
Davies, "Robotics in Minimally Invasive Surgery" Internet, 1995, pp. 5/1-5/2.
Digiorgio, James, "Is Your Emergency Department of the 'Leading Edge?", Internet, 2005, pp. 1-4.
Elhajj, et al., "Supermedia in Internet-based telerobotic operations", Internet, 2001 , pp. 1-14.
Elhajj, et al., "Synchronization and Control of Supermedia Transmission Via the Internet", Proceedings of 2001 International Symposium on Intelligent Multimedia Video and Speech Processing. Hong Kong, May 2-4, 2001.
Ellison, et al., "Telerounding and Patient Satisfaction Following Surgery".
Ando, et al., "A Multimedia Self-service Terminal with Conferencing Functions", IEEE 1995 , pp. 357-362.
Fetterman, "Videoconferencing over the Internet", Internet 2001 , pp. 1-8.
Fels, "Developing a Video-Mediated Communication System for Hospitalized Children", Telemedicine Journal, vol. 5, No. 2, 1999.
Ghiasi, "A Generic Web-based Teleoperations Architecture: Details and Experience", SPIE Conference on Telemanipulator and Telepresence Technologies VI Sep. 1999.
Goldberg, "Desktop Teleoperation via the World Wide Web, Proceedings of the IEEE International Conference on Robotics and Automation", http://citeseer.ist.osu.edu/cache/oaoers/cs/5/ffo:zSzzSzusc.eduzSzoubzSziriszSzraiders.odf/aol 1995 , 654-659.
Goldberg, "More Online Robots, Robots that Manipulate", Internet, Updated Aug. 2001 http://ford.ieor.berkeley.edu/ir/robots a2.html.
Goldberg, et al., "Collaborative Teleoperation via the Internet" IEEE International Conference on Robotics and Automation San Francisco, California, Apr. 2000.
Goldenberg, et al., "Telemedicine in Otolaryngology", American Journal of Otolaryngology vol. 23, No. 1, 2002 , pp. 35-43.
Goldman, Lea, "Machine Dreams", Entrepreneurs, Forbes, May 27, 2002.
Gump, Michael D., "Robot Technology Improves VA Pharmacies", Internet, 2001, pp. 1-3.
Han, et al., "Construction of an Omnidirectional Mobile Robot Platform Based on Active Dual-Wheel Caster Mechanisms and Development of a Control Simulator", Kluwer Acedemic Publishers, vol. 29, pp. 257-275.
Handley, "RFC 2327—SDP:Session Description Protocol", http://www.faqs.org/rfcs/rfc2327.html, Apr. 1998.
Hanebeck, "ROMAN: a mobile Robotic Assistant for Indoor Service Applications", Proceedings of the 1997 IEEE/RSJ International Conference on Intelligent Robots and Systems, 1997.
Harmo, et al., "Moving Eye—Interactive Telepresence Over Internet With a Ball Shaped Mobile Robot", 2000.
Haule, et al., "Control Scheme for Delayed Teleoperation Tasks", Proceedings of the Pacific Rim Conference on Communications, Computer and Signal Processing, May 17, 1995.
Ishiguro, "Integrating a Perceptual Information Infrastructure with Robotic Avatars: A Framework for Tele-Existence", Proceeding of IEEE Conference on Intelligent Robots and Systems, http://www.ai.soc.i.kyoto-u.ac.jp/services/publications/99/99conf/07.pdf.
Ishihara, et al., "Intelligent Microrobot DDS (Drug Delivery System) Measured and Controlled by Ultrasonics", IEEE/RSJ,vol. 2 Nov. 3, 1991, pp. 1145-115.
Ivanova, Natali, "Masters thesis: Internet Based Interface for Control of a Mobile Robot", Department of Numerical Analysis and Computer Science.
Jenkins, "Telehealth Advancing Nursing Practice", Nursing Outlook, vol. 49, No. 2, Mar./Apr. 2001.
Johanson, "Supporting video-mediated communication over the Internet", Chalmers University of Technology,Dept of Computer Engineering, Gothenburg, Sweden 2003.

(56) References Cited

OTHER PUBLICATIONS

Jouppi, et al., "First Steps Towards Mutually-Immersive Mobile Telepresence", CSCW, 02 New Orleans LA Nov. 16-20, 2002.
Jouppi, et al., "Mutually-lmmersive Audio Telepresence", Audio Engineering Society Convention Paper, presented at 113th Convention, Oct. 2002.
Kanehiro, Fumio et al., "Virtual Humanoid Robot Platform to Develop Controllers of Real Humanoid Robots without Porting", IEEE, 2001 , pp. 3217-3276.
Kaplan, et al., "An Internet Accessible Telepresence".
Simmons, "Xavier: An Autonomous Mobile Robot on the Web", IEEE Robotics and Automation Magazine 1999 , pp. 43-48.
Keller, et al., "Raven Interface Project", Fall 2001, http://upclose.lrdc.pitt.edu/people/louw_assets/Raven_Slides.
Khatib, "Robots in Human Environments", Proc. International Conference on Control, Automation, Robotics, and Vision, ICRACV2000, Singapore Dec. 2000 , pp. 454-457.
Kuzuoka, et al., "Can The GestureCam Be A Surrogate?".
Lane, "Automated Aides", Newsday,http://www.cs.cum.edu/nurseboUweb/press/nd4380.htm, Oct. 17, 2000.
Lee, et al., "A novel method of surgical instruction: International telementoring", Internet 1998 , pp. 1-4.
Lim, et al., "Control to Realize Human-like Walking of a Biped Humanoid Robot", IEEE 2000 , pp. 3271-3276.
Linebarger, et al., "Concurrency Control Mechanisms for Closely Coupled Collaboration in Multithreaded Virtual Environments", Presence, Special Issue on Advances in Collaborative VEs 2004.
Loeb, Gerald, "Virtual Visit: Improving Communication for Those Who Need It Most", 2001.
Long, "HelpMate Robotics, Inc. (Formerly Transitions Research Corporation) Robot Navigation Technology", NIST Special Publication http://www.atp.nist.gov/eao/sp950-1/helpmate.htm, Mar. 1999, pp. 950-951.
Luna, Nancy, "Robot a new face on geriatric care", OC Register Aug. 6, 2003.
Mack, "Minimally invasive and robotic surgery", Internet IEEE 2001 , pp. 568-572.
Mair, "Telepresence—The Technology. And Its Economic and Social Implications", IEEE Technology and Society 1997.
Martin, Anya, "Days Ahead", Assisted Living Today, vol. 9 Nov./Dec. 2002 , pp. 19-22.
McCardle, et al., "The challenge of utilizing new technology in design education", Internet 2000 , pp. 122-127.
Meng, et al., "E-Service Robot in Home Healthcare", Proceedings of the 2000 IEEE/RSJ, International Conference on Intelligent Robots and Systems, 2000 , pp. 832-837.
Michaud, "Introducing 'Nursebot", The Boston Globe, http://www.cs.cmu.edu/nursebot/web/press/globe 3 01/index.html Sep. 11, 2001 , pp. 1-5.
Montemerlo, "Telepresence: Experiments in Next Generation Internet", CMU Robotics Institute http://www.rLcmu.edu/creative/archives.htm (VideoITranscript), Oct. 20, 1998.
Murphy, "Introduction to A1 Robotics", 2000.
Nakajima, et al., "A Multimedia Teleteaching System sing an Electronic Whiteboard for Two Way Communication of Motion Videos and Chalkboards", IEEE 1993 , pp. 436-441.
Ogata, et al., "Development of Emotional Communication Robot: WAMOEBA—2r—Experimental evaluation ", IEEE 2000 , pp. 175-180.
Ogata, et al., "Emotional Communication Robot: WAMOEBA—2R—Emotion Model and Evaluation Experiments", Internet, 1999, pp. 1-16.
Oh, et al., "Autonomous Battery Recharging for Indoor Mobile Robots", Proceedings of Australian Conference on Robotics and Automation http://users.rsise.anu.edu.au/rsl/rsl papers/ACRA2000/Auto Recharge Paper.pdf 2000.
Ojha, Anad, "An application of Virtual Reality in Rehabilitation", IEEE Jan. 1994 , pp. 4-.
Orini, "Health Care Robotics: A Progress Report", IEEE International Conference on Robotics and Automation Apr. 1997 , 1271-1276.
Paulos, et al., "A World Wide Web Telerobotic Remote Environment Browser", http://vive.cs.berkeley.edu/capek, 1995.
Paulos, "Designing Personal Tele-embodiment", IEEE International Conference on Robotics and Automation, http://www.prop.org/papers/icra98.pdf 1998.
Paulos, Eric J., "Personal Tele-Embodiment", UC Berkeley, Fall 2001.
Paulos, "PRoP: Personal Roving Presence", ACM:CHI Proceedings of CHI '98,http://www.prop.org/papers/chi98.pdf.
Paulos, et al., "Ubiquitous Tele-embodiment: Applications and Implications", International Journal of Human Computer Studies, vol. 46, No. 6 Jun. 1997 , pp. 861-877.
Paulos, "Video of PRoP 2 at Richmond Field Station, www.prop.org", Printout of Home Page of Website and two-page Transcript of the audio portion of said PRoP Video May 2001.
Pin, et al., "A New Family of Omnidirectional and Holonomic Wheeled Platforms for Mobile Robots", IEEE, vol. 10, No. 4 Aug. 1994.
Rovetta, et al., "A New Telerobotic Application: Remote I.aparoscopic Surgery Using", International Journal of Robotics Research Jun. 1, 1996 , pp. 267-279.
Roy, et al., "Towards Personal Service Robots for the Elderly", Internet Mar. 7, 2002.
Salemi, et al., "MILO: Personal robot platform", Internet 2005 , pp. 1-6.
Sandt, et al., "Perceptions for a Transport Robot in Public Environments", IROS 1997.
Schaeffer, "Care-O-bot: A System for Assisting Elderly or Disabled Persons in Home Environments", Proceedings of AAATE-99, http://morpha.de/download/publications/IPA_Systems_For_AssistingElderILor_DisabledPersons_AAATE1999.pdf 1999.
Schulz, "Web Interfaces for Mobile Robots in Public Places", Robotics & Automation Magazine, IEEE, vol. 7, Issue 1 Mar. 2000.
Shimoga, et al., "Touch and force reflection for telepresence surgery", IEEE 1994 , pp. 1049-1050.
Siegwart, "Interacting Mobile Robots on the Web", Proceedings of the 1999 IEEE International Conference on Robotics and Automation May 1999.
Stephenson, Gary, "Dr. Robot Tested at Hopkins", Internet, Aug. 5, 2003 , pp. 1-2.
Stoianovici, et al., "Robotic Tools for Minimally Invasive Urologic Surgery", Internet, Dec. 2002 , 1-17.
Suplee, "Mastering the Robot", The Washington Post http://www.cs.cmu.edu-nursebotlweb/press/wash/index.html Sep. 17, 2000 , p. A01.
Tahboub, et al., "Dynamics Analysis and Control of a Holonomic Vehicle With Continously Variable Transmission", Journal of Dynamic Systems, Measurement and Control ASME vol. 124 Mar. 2002 , pp. 118-126.
Tendick, et al., "Human-Machine Interfaces for Minimally Invasive Surgery", IEEE 1997 , pp. 2771-2776.
Thrun, et al., "Probabilistic Algorithms and the Interactive Museum Tour-Guide Robot Minerva", Internet 2000 , pp. 1-35.
Tzafestas, et al., "VR-based Teleoperation of a Mobile Robotic Assistant: Progress Report", Internet Nov. 2000 , pp. 1-23.
Urquhart, Kim, "InTouch's robotic Companion 'beams up' healthcare experts", Medical Device Daily, vol. 7, No. 39 Feb. 27, 2003 , p. 1,4.
Weiss, et al., "Telework and video-mediated communication: Importance of real-time, interactive communication for workers with disabilities", California State University Northridge http://www.csun.edu/cod/conf/1999/proceedings/session0238.html, pp. 1-4.
West, et al., "Design of Ball Wheel Mechanisms for Omnidirectional Vehicles with Full Mobility and Invariant Kinematics", Journal of Mechanical Design , vol. 119 Jun. 1997 , pp. 153-161.
Yamasaki, et al., "Applying Personal Robots and Active Interface to Video Conference Systems", Internet 1995 , pp. 243-248.
Yamauchi, et al., "PackBot: A Versatile Platform for Military Robotics", Internet 2004 , pp. 1-10.

(56) References Cited

OTHER PUBLICATIONS

Yong, et al., "Robot task execution with telepresence using virtual reality technology", Internet 1998, pp. 1-9.
Zamrazil, Kristie, "Telemedicine in Texas: Public Policy Concerns", House Research Organization Focus Report, Texas House of Representatives, http://www.hro.house.state.tx.us/focus/telemed.pdf May 5, 2000, 76-22.
Zipperer, Lorri, "Robotic dispensing system", 1999, pp. 1-2.
Zorn, Benjamin G., "Ubiquitous Telepresence", http://www.cs.colorado.edu/-zorn/utlvision/vision.html, Mar. 5, 1996.
Magne Charge—Smart Power for Electric Vehicles, Internet, Jun. 27, 2002.
Evans, et al., "HelpMate®, the trackless robotic courier: A perspective on the development of a commercial autonomous mobile robot", Lecture Notes in Control and Information Sciences,1998, pp. 3. Document available at: http://www.springerlink.com/content/5t4526646283p42x/.
Roland Piquepaille'S, "Technology Trends, How new technologies are modifying your way of life", Internet, 2003, pp. 1-2.
Brooks, "A Robust Layered Control System for a Mobile Robot," IEEE Journal of Robotics and Automation, 2 (1), Mar. 1986, 10 pgs.
Davis, "Meet iRobot, The Smartest Webcam on Wheels," Wired Magazine, 8.09, http://www.wired.com/wired/archive/8.09/irobot_pr.html, Sep. 2000, 2 pgs.
Dean, et al., "1992 AAAI Robot Exhibition and Competition," Al Magazine, Spring 1993, 10 pgs.
Grow, "Office Coworker Robot," Time Magazine, http://www.time.com/time/specials/packages/article/0,28804,1936165_1936255_1936640, 00.html, Nov. 19, 2001, 2 pgs.
Keller, et al., "Raven Interface Project", Fall 2001, http://upclose.lrdc.pitt.edu/people/louw_assets/Raven_Slides.pps, Fall 2001.
Knight, et al., "Active Visual Alignment of a Mobile Stereo Camera Platform", Proceedings of the IEEE, International Conference on Robotics and Automation, San Francisco, Apr. 24-28, 2000, pp. 3202-3208.
"PictureTel Adds New Features and Functionality to Its Award-Winning Live200 Desktop Videoconferencing System", PR Newswire Association, LLC, Gale, Cengage Learning, http://www.thefreelibrary.com/PictureTel+Adds+New+Features+and+Functionality+to+Its+Award-Winning . . .-a019512804, Jun. 13, 1997.
U.S. Appl. No. 10/783,760, filed Feb. 20, 2004, Wang, et al., 48 pgs.
U.S. Appl. No. 60/449,762, filed Feb. 24, 2003, Wang, et al., 28 pgs.
Weiss, et al., "PEBBLES: A Personal Technology for Meeting Education, Social and Emotional Needs of Hospitalised Children", Personal and Ubiquitous Computing 5, Springer-Verlag London Ltd., 2001, pp. 157-168.

* cited by examiner

GRAPHICAL INTERFACE FOR A REMOTE PRESENCE SYSTEM

CROSS-REFERENCE TO RELATED APPLICATIONS

This is a continuation of U.S. application Ser. No. 10/962,829 filed Oct. 11, 2004, which claims priority to U.S. Provisional Application No. 60/548,561 filed on Feb. 26, 2004.

BACKGROUND OF THE INVENTION

1. Field of the Invention

The subject matter disclosed generally relates to the field of mobile two-way teleconferencing.

2. Background Information

There is a growing need to provide remote health care to patients that have a variety of ailments ranging from Alzheimers to stress disorders. To minimize costs it is desirable to provide home care for such patients. Home care typically requires a periodic visit by a health care provider such as a nurse or some type of assistant. Due to financial and/or staffing issues the health care provider may not be there when the patient needs some type of assistance. Additionally, existing staff must be continuously trained, which can create a burden on training personnel. It would be desirable to provide a system that would allow a health care provider to remotely care for a patient without being physically present.

Robots have been used in a variety of applications ranging from remote control of hazardous material to assisting in the performance of surgery. For example, U.S. Pat. No. 5,762,458 issued to Wang et al. discloses a system that allows a surgeon to perform minimally invasive medical procedures through the use of robotically controlled instruments. One of the robotic arms in the Wang system moves an endoscope that has a camera. The camera allows a surgeon to view a surgical area of a patient.

Tele-robots such as hazardous waste handlers and bomb detectors may contain a camera that allows the operator to view the remote site. Canadian Pat. No. 2289697 issued to Treviranus, et al. discloses a teleconferencing platform that has both a camera and a monitor. The platform includes mechanisms to both pivot and raise the camera and monitor. The Treviranus patent also discloses embodiments with a mobile platform, and different mechanisms to move the camera and the monitor.

There has been marketed a mobile robot introduced by InTouch-Health, Inc., the assignee of this application, under the trademarks COMPANION and RP-6. The InTouch robot is controlled by a user at a remote station. The remote station may be a personal computer with a joystick that allows the user to remotely control the movement of the robot. Both the robot and remote station have cameras, monitors, speakers and microphones to allow for two-way video/audio communication.

U.S. Pat. Application Pub. No. US 2001/0054071 filed in the name of Loeb, discloses a video-conferencing system that includes a number of graphical user interfaces ("GUIs") that can be used to establish a video-conference. One of the GUIs has an icon that can be selected to make a call. The Loeb application discloses stationary video-conferencing equipment such as a television. There is no discussion in Loeb about the use of robotics.

BRIEF SUMMARY OF THE INVENTION

A robot system that includes a remote station and a robot. The remote station includes a display user interface that can be used to operate the system.

DETAILED DESCRIPTION

Disclosed is a robot system that includes a robot and a remote station. The remote station may be a personal computer coupled to the robot through a broadband network. A user at the remote station may receive both video and audio from a camera and a microphone of the robot, respectively. The remote station may include a display user interface that has a variety of viewable fields and selectable buttons.

Figure 1:
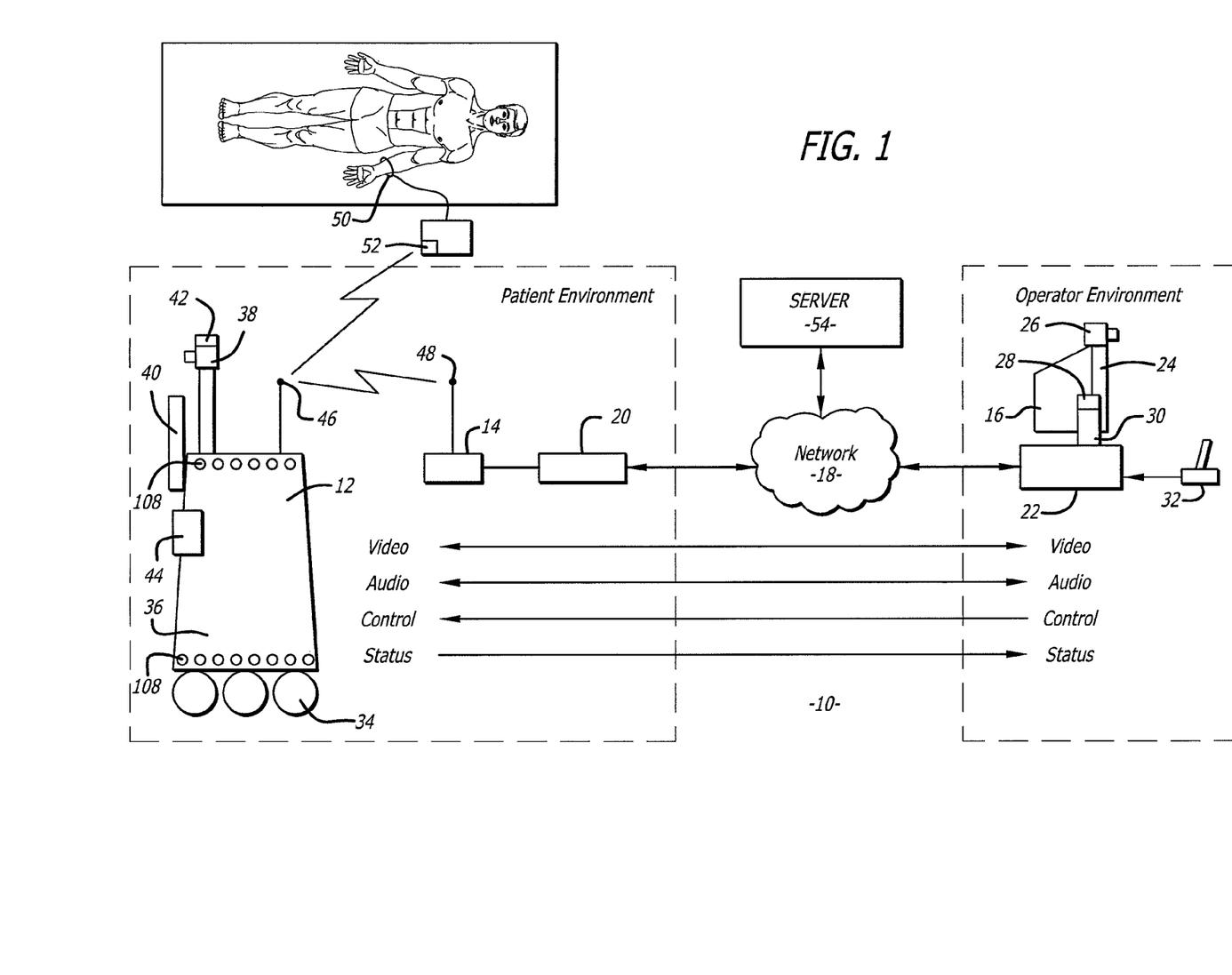
FIG. 1 is an illustration of a robotic system.

Referring to the drawings more particularly by reference numbers, FIG. 1 shows a system 10. The robotic system includes a robot 12, a base station 14 and a remote control station 16. The remote control station 16 may be coupled to the base station 14 through a network 18. By way of example, the network 18 may be either a packet switched network such as the Internet, or a circuit switched network such has a Public Switched Telephone Network (PSTN) or other broadband system. The base station 14 may be coupled to the network 18 by a modem 20 or other broadband network interface device. By way of example, the base station 14 may be a wireless router. Alternatively, the robot 12 may have a direct connection to the network thru for example a satellite.

The remote control station 16 may include a computer 22 that has a monitor 24, a camera 26, a microphone 28 and a speaker 30. The computer 22 may also contain an input device 32 such as a joystick or a mouse. The control station 16 is typically located in a place that is remote from the robot 12. Although only one remote control station 16 is shown, the system 10 may include a plurality of remote stations. In general any number of robots 12 may be controlled by any number of remote stations 16 or other robots 12. For example, one remote station 16 may be coupled to a plurality of robots 12, or one robot 12 may be coupled to a plurality of remote stations 16, or a plurality of robots 12.

Each robot 12 includes a movement platform 34 that is attached to a robot housing 36. Also attached to the robot housing 36 are a camera 38, a monitor 40, a microphone(s) 42 and a speaker(s) 44. The microphone 42 and speaker 30 may create a stereophonic sound. The robot 12 may also have an antenna 46 that is wirelessly coupled to an antenna 48 of the base station 14. The system 10 allows a user at the remote control station 16 to move the robot 12 through operation of the input device 32. The robot camera 38 is coupled to the remote monitor 24 so that a user at the remote station 16 can view a patient. Likewise, the robot monitor 40 is coupled to the remote camera 26 so that the patient may view the user. The microphones 28 and 42, and speakers 30 and 44, allow for audible communication between the patient and the user.

The remote station computer 22 may operate Microsoft OS software and WINDOWS XP or other operating systems such as LINUX. The remote computer 22 may also operate a video driver, a camera driver, an audio driver and a joystick driver. The video images may be transmitted and received with compression software such as MPEG CODEC.

The robot 12 may be coupled to one or more medical monitoring devices 50. The medical monitoring device 50 can take medical data from a patient. By way of example, the medical monitoring device 50 may be a stethoscope, a pulse oximeter and/or an EKG monitor. The medical monitoring device 50 may contain a wireless transmitter 52 that transmits the patient data to the robot 12. The wirelessly transmitted data may be received by antennae 46, or a separate antennae (not shown). The robot 12 can then transmit the data to the remote station 16.

The wireless transmission from the medical monitoring device 50 may be in accord with various wireless standards such as IEEE. The standard used to transmit data from the medical monitoring device 50 should not interfere with the wireless communication between the robot 12 and the base station 14. Although wireless transmission is shown and described, it is to be understood that the medical monitoring device 50 can be coupled to the robot 12 by wires (not shown).

The remote station 16 may be coupled to a server 54 through the network 18. The server 54 may contain electronic medical records of a patient. By way of example, the electronic medical records may include written records of treatment, patient history, medication information, x-rays, EKGs, laboratory results, physician notes, etc. The medical records can be retrieved from the server 54 and displayed by the monitor 24 of the remote station. In lieu of, or in addition to, the medical records can be stored in the mobile robot 12. The remote station 16 may allow the physician to modify the records and then store the modified records back in the server 54 and/or robot 12.

Figure 2:
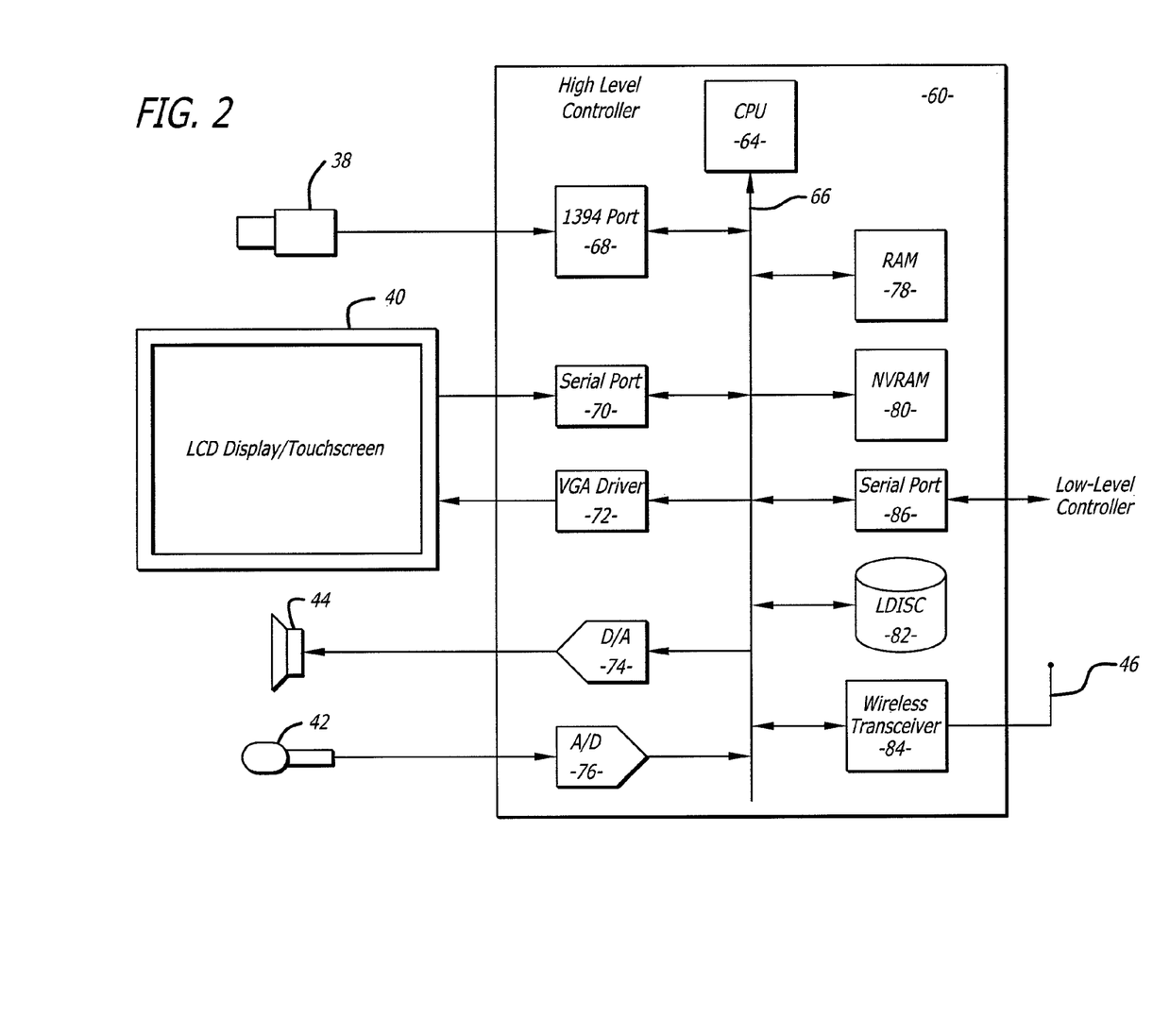
FIG. 2 is a schematic of an electrical system of a robot.
Figure 3:
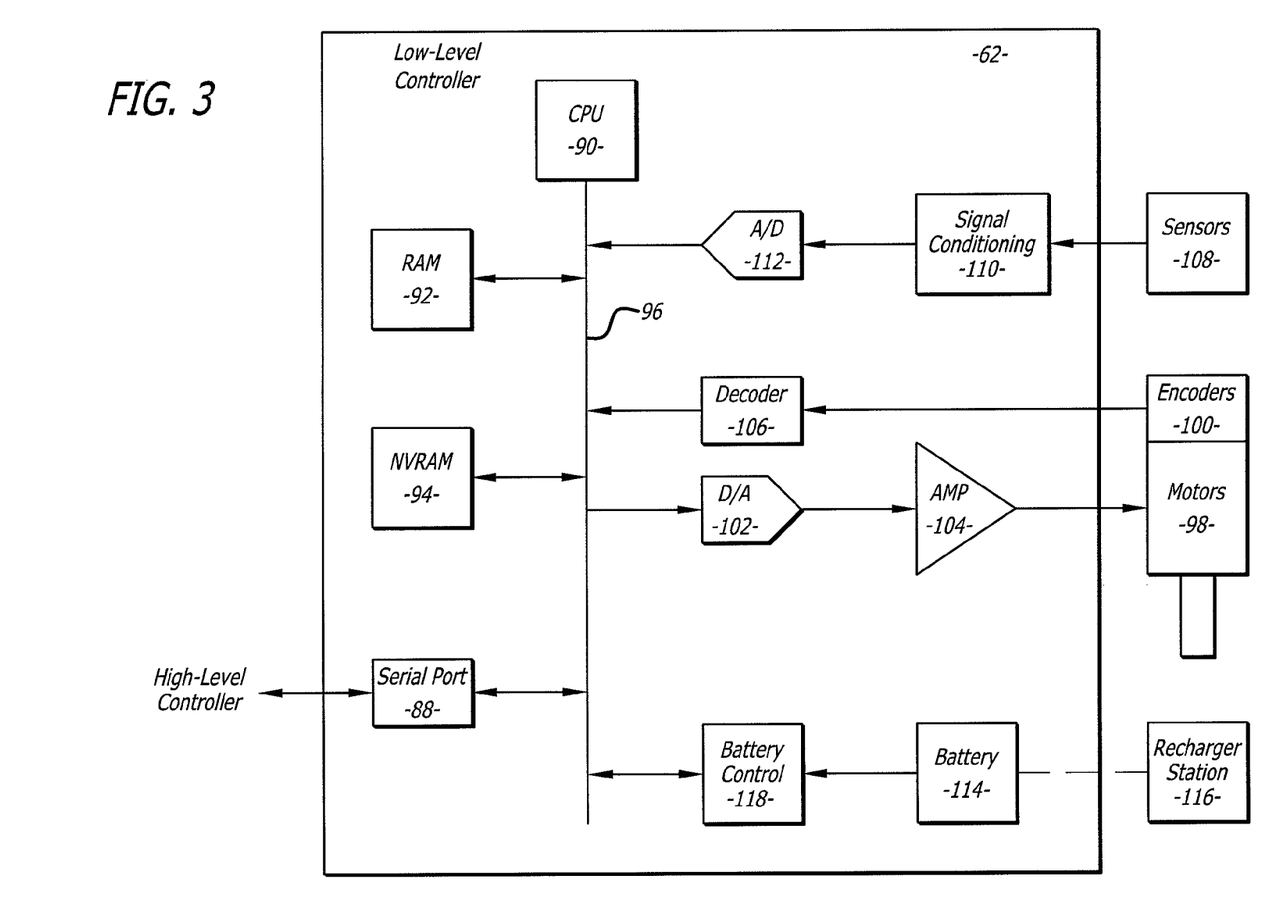
FIG. 3 is a further schematic of the electrical system of the robot.

FIGS. 2 and 3 show an embodiment of a robot 12. Each robot 12 may include a high level control system 60 and a low level control system 62. The high level control system 60 may include a processor 64 that is connected to a bus 66. The bus is coupled to the camera 38 by an input/output (I/O) port 68, and to the monitor 40 by a serial output port 70 and a VGA driver 72. The monitor 40 may include a touchscreen function that allows the patient to enter input by touching the monitor screen.

The speaker 44 is coupled to the bus 66 by a digital to analog converter 74. The microphone 42 is coupled to the bus 66 by an analog to digital converter 76. The high level controller 60 may also contain random access memory (RAM) device 78, a non-volatile RAM device 80 and a mass storage device 82 that are all coupled to the bus 66. The mass storage device 82 may contain medical files of the patient that can be accessed by the user at the remote control station 16. For example, the mass storage device 82 may contain a picture of the patient. The user, particularly a health care provider, can recall the old picture and make a side by side comparison on the monitor 24 with a present video image of the patient provided by the camera 38. The robot antennae 46 may be coupled to a wireless transceiver 84. By way of example, the transceiver 84 may transmit and receive information in accordance with IEEE 802.11b. The transceiver 84 may also process signals from the medical monitoring device in accordance with IEEE also known as Bluetooth.

The robot may have a separate antennae to receive the wireless signals from the medical monitoring device.

The processor 64 may operate with a LINUX OS operating system. The processor 64 may also operate MS WINDOWS along with video, camera and audio drivers for communication with the remote control station 16. Video information may be transceived using MPEG CODEC compression techniques. The software may allow the user to send e-mail to the patient and vice versa, or allow the patient to access the Internet. In general the high level controller 60 operates to control communication between the robot 12 and the remote control station 16.

The high level controller 60 may be linked to the low level controller 62 by serial ports 86 and 88. The low level controller 62 includes a processor 90 that is coupled to a RAM device 92 and non-volatile RAM device 94 by a bus 96. Each robot 12 contains a plurality of motors 98 and motor encoders 100. The motors 98 can activate the movement platform and move other parts of the robot such as the monitor and camera. The encoders 100 provide feedback information regarding the output of the motors 98. The motors 98 can be coupled to the bus 96 by a digital to analog converter 102 and a driver amplifier 104. The encoders 100 can be coupled to the bus 96 by a decoder 106. Each robot 12 also has a number of proximity sensors 108 (see also FIG. 1). The position sensors 108 can be coupled to the bus 96 by a signal conditioning circuit 110 and an analog to digital converter 112.

The low level controller 62 runs software routines that mechanically actuate the robot 12. For example, the low level controller 62 provides instructions to actuate the movement platform to move the robot 12. The low level controller 62 may receive movement instructions from the high level controller 60. The movement instructions may be received as movement commands from the remote control station or another robot. Although two controllers are shown, it is to be understood that each robot 12 may have one controller, or more than two controllers, controlling the high and low level functions.

The various electrical devices of each robot 12 may be powered by a battery(ies) 114. The battery 114 may be recharged by a battery recharger station 116. The low level controller 62 may include a battery control circuit 118 that senses the power level of the battery 114. The low level controller 62 can sense when the power falls below a threshold and then send a message to the high level controller 60.

The system may be the same or similar to a robotic system provided by the assignee InTouch-Health, Inc. of Santa Barbara, Calif. under the name RP-6, which is hereby incorporated by reference. The system may also be the same or similar to the system disclosed in application Ser. No. 10/206,457 published on Jan. 29, 2004, which is hereby incorporated by reference.

Figure 4:
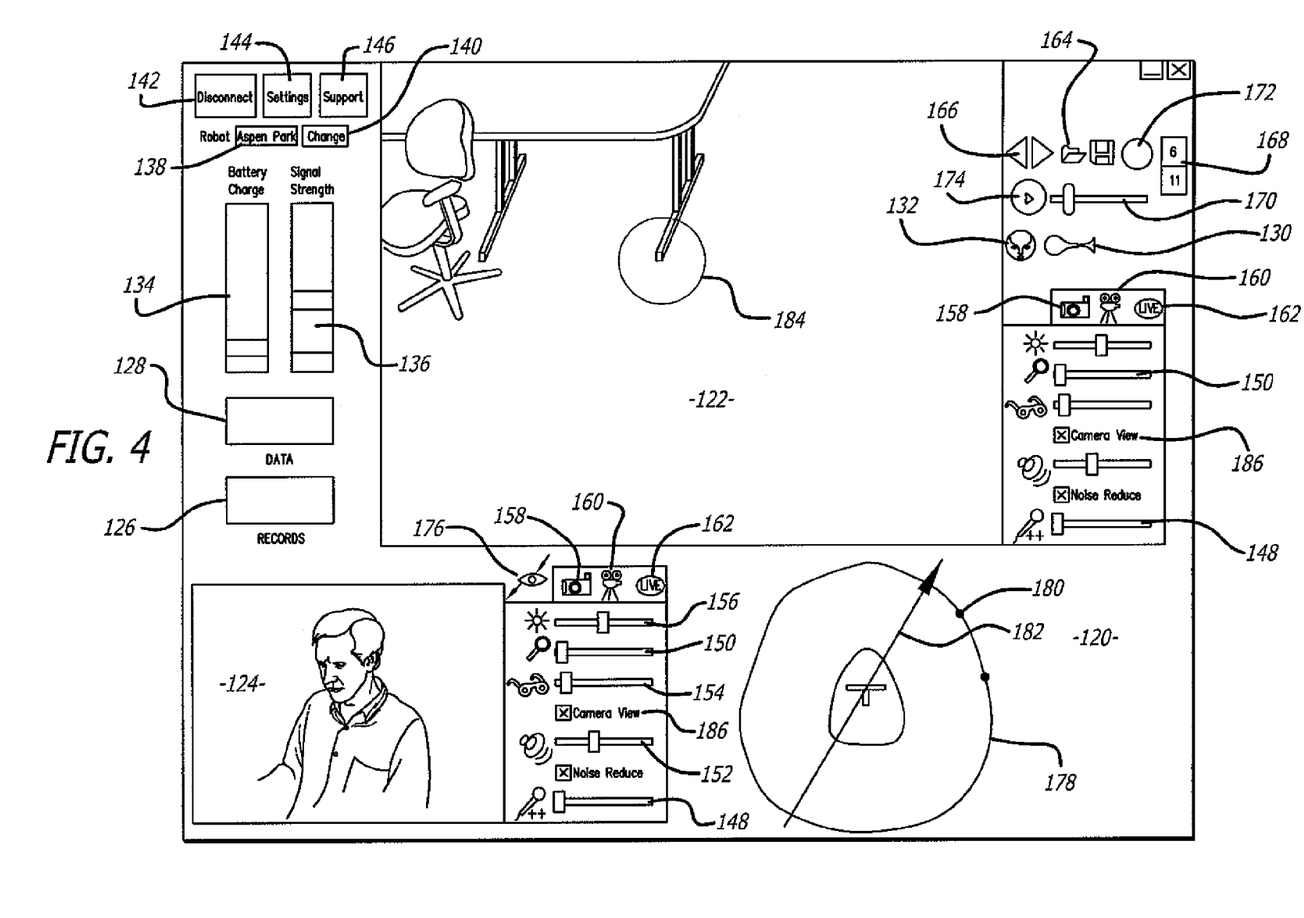
FIG. 4 is a display user interface of a remote station.

FIG. 4 shows a display user interface ("DUI") 120 that can be displayed at the remote station 16 and/or the robot 12. The DUI 120 may include a robot view field 122 that displays a video image captured by the camera of the robot. The DUI 120 may also include a station view field 124 that displays a video image provided by the camera of the remote station 16. The DUI 120 may be part of an application program stored and operated by the computer 22 of the remote station 16.

Figure 5:
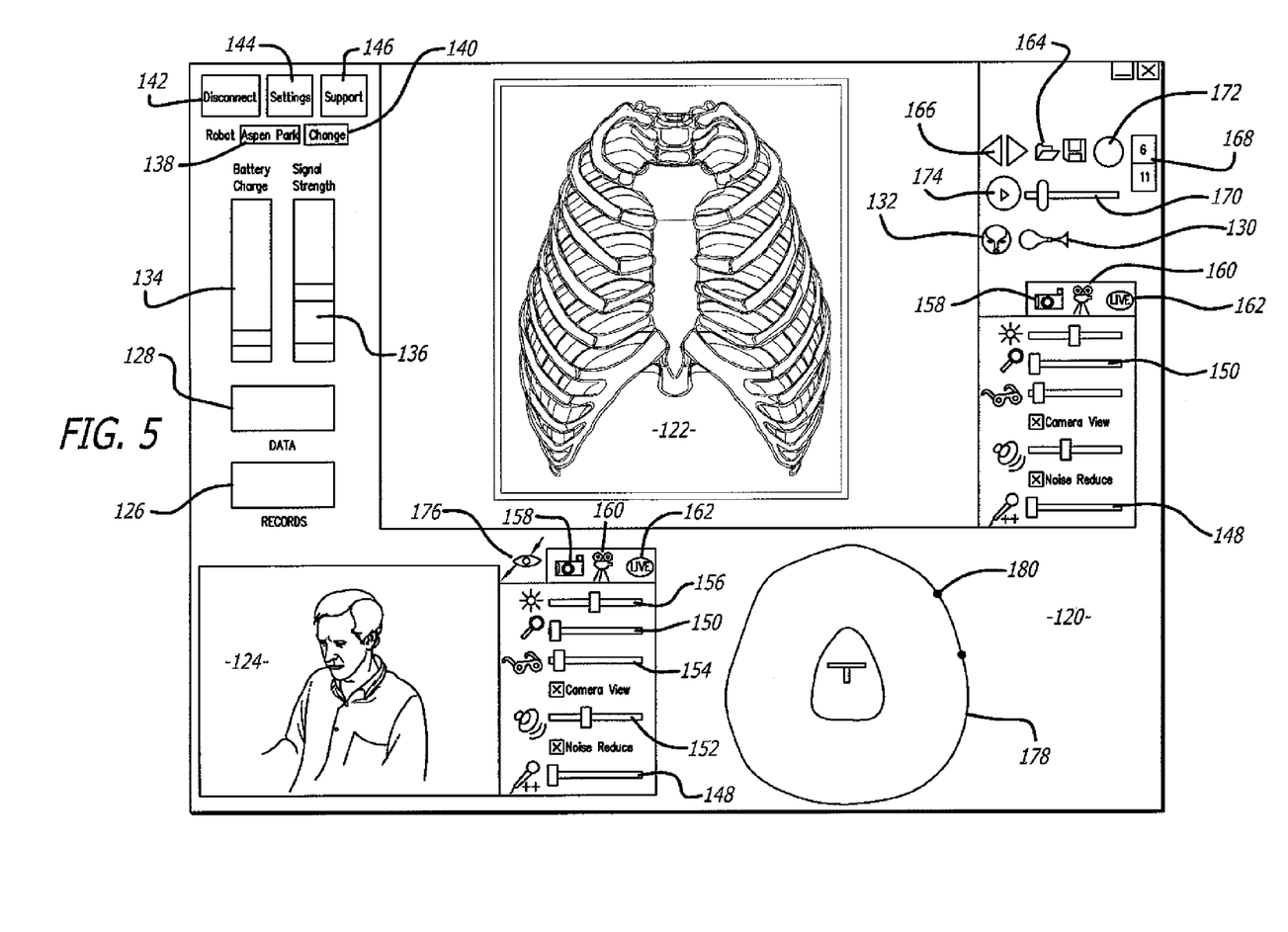
FIG. 5 is a display user interface showing an electronic medical record.

The DUI 120 may include a graphic button 126 that can be selected to display an electronic medical record as shown in FIG. 5. The button 126 can be toggled to sequentially view the video image and the electronic medical record.

Figure 6:
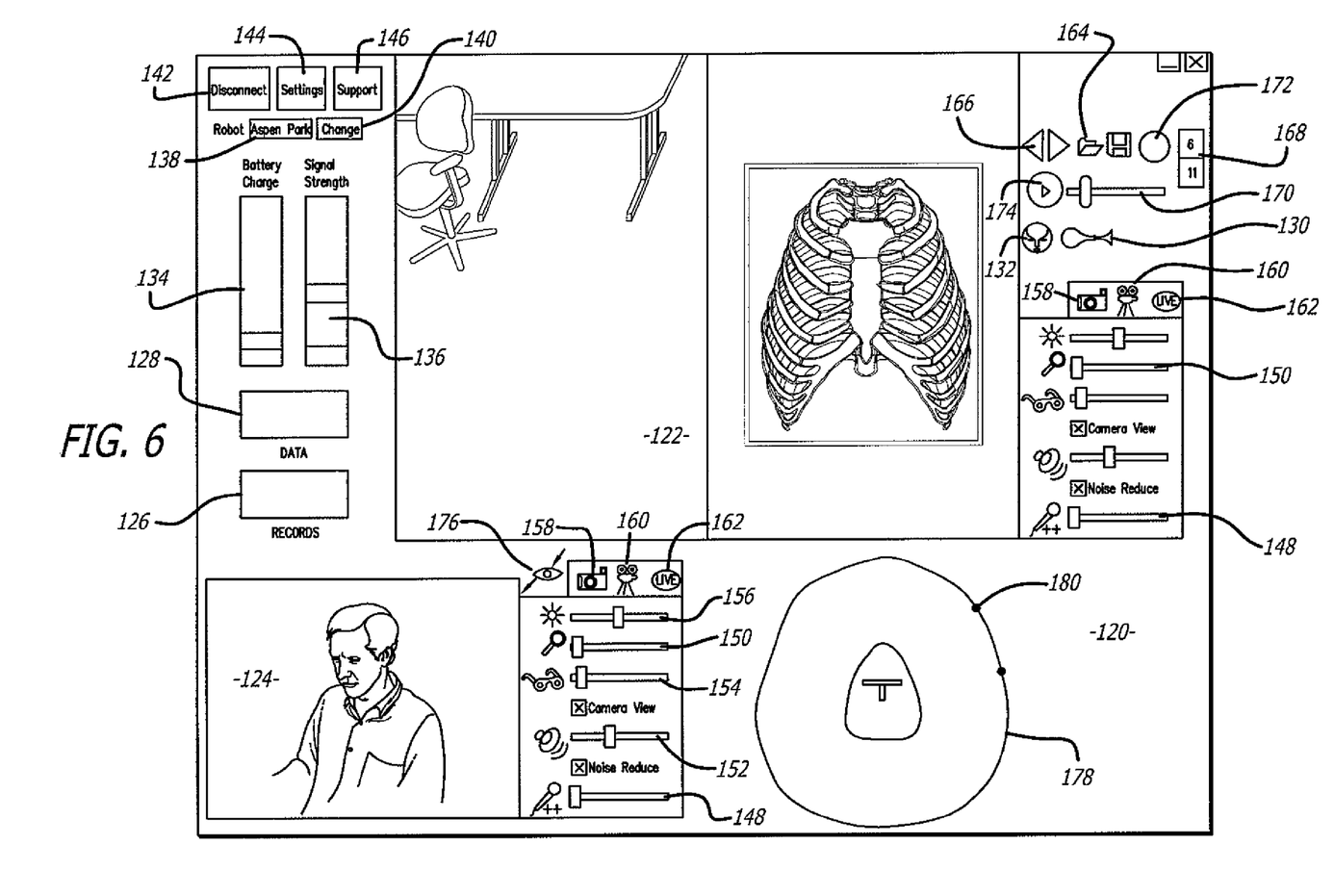
FIG. 6 is a display user interface showing an image and an electronic medical record being simultaneously displayed.

Alternatively, the view field 122 may be split to simultaneously display both the video image and the electronic medical record as shown in FIG. 6. The viewing field may allow the physician to modify the medical record by adding, changing or deleting all or part of the record. The remote clinician can also add to the medical record still images or video captured by the camera of the robot.

The DUI 120 may have a monitor data field 128 that can display the data generated by the medical monitoring device(s) and transmitted to the remote station. The data can be added to the electronic medical record, either automatically or through user input. For example, the data can be added to a record by "dragging" a monitor data field 128 into the viewing field 122.

The DUI 120 may include alert input icons 130 and 132. Alert icon 130 can be selected by the user at the remote station to generate an alert indicator such as a sound from the speaker of the robot. Selection of the icon generates an alert input to the robot. The robot generates a sound through its speaker in response to the alert input. By way of example, the sound may simulate the noise of a horn. Consequently, the icon may have the appearance of a horn. The remote station user may select the horn shaped icon 130 while remotely moving the robot to alert persons to the presence of the moving robot.

Alert icon 132 can be selected to request access to the video images from the robot. The default state of the robot may be to not send video information to the remote station. Selecting the alert icon 132 sends an alert input such as an access request to the robot. The robot then generates an alert indicator. The alert indicator can be a sound generated by the robot speaker, and/or a visual prompt on the robot monitor. By way of example, the visual prompt may be a "flashing" graphical icon. The sound may simulate the knocking of a door. Consequently, the alert icon 132 may have the appearance of a door knocker.

In response to the alert indicator the user may provide a user input such as the depression of a button on the robot, or the selection of a graphical image on the robot monitor, to allow access to the robot camera. The robot may also have a voice recognition system that allows the user to grant access with a voice command. The user input causes the robot to begin transmitting video images from the robot camera to the remote station that requested access to the robot. A voice communication may be established before the cycle of the alert input and response, to allow the user at the remote station to talk to the caller recipient at the robot.

The DUI 120 may include a graphical "battery meter" 134 that indicates the amount of energy left in the robot battery. A graphical "signal strength meter" 136 may indicate the strength of the wireless signal transmitted between the robot and the base station (see FIG. 1).

The DUI 120 may include a location display 138 that provides the location of the robot. The CHANGE button 140 can be selected to change the default robot in a new session. The CHANGE button 140 can be used to select and control a different robot in a system that has multiple robots. The user can initiate and terminate a session by selecting box 142. The box 142 changes from CONNECT to DISCONNECT when the user selects the box to initiate a session. System settings and support can be selected through buttons 144 and 146.

Both the robot view field 122 and the station view field 124 may have associated graphics to vary the video and audio displays. Each field may have an associated graphical audio slide bar 148 to vary the audio level of the microphone and another slide bar 152 to vary the volume of the speakers.

The DUI 120 may have slide bars 150, 154 and 156 to vary the zoom, focus and brightness of the cameras, respectively. A still picture may be taken at either the robot or remote station by selecting one of the graphical camera icons 158. The still picture may be the image presented at the corresponding field 122 or 124 at the time the camera icon 158 is selected. Capturing and playing back video can be taken through graphical icons 160. A return to real time video can be resumed, after the taking of a still picture, captured video, or reviewing a slide show, by selecting a graphical LIVE button 162.

A still picture can be loaded from disk for viewing through selection of icon 164. Stored still images can be reviewed by selecting buttons 166. The number of the image displayed relative to the total number of images is shown by graphical boxes 168. The user can rapidly move through the still images in a slide show fashion or move through a captured video clip by moving the slide bar 170. A captured video image can be paused through the selection of circle 174. Play can be resumed through the same button 174. Video or still images may be dismissed from the active list through button 172. Video or still images may be transferred to the robot by selecting icon 176. For example, a doctor at the remote station may transfer an x-ray to the screen of the robot.

A graphical depiction of the base of the robot can be shown in sensor field 178. The sensor may have various sensors that sense contact with another object. The sensor field 178 can provide a visual display of the sensors that detect the object. By way of example, the field may have one or more graphical dots 180 that display where on the robot the sensors detected an object. This provides the user with a sense of the robot environment that is outside the view of the robot camera.

The graphical depiction of the robot base may contain a graphical vector overlay 182 that indicates the direction of robot movement. The direction of movement may be different than the direction the camera is facing. The vector can provide a visual aid when driving the robot.

The system may provide the ability to annotate 184 the image displayed in field 122 and/or 124. For example, a doctor at the remote station may annotate some portion of the image captured by the robot camera. The annotated image may be stored by the system. The system may also allow for annotation of images sent to the robot through icon 176. For example, a doctor may send an x-ray to the robot which is displayed by the robot screen. The doctor can annotate the x-ray to point out a portion of the x-ray to personnel located at the robot site. This can assist in allowing the doctor to instruct personnel at the robot site.

The display user interface may include graphical inputs 186 that allow the operator to turn the views of the remote station and remote cameras on and off.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A robot system, comprising:
a robot that has a camera, a monitor and a speaker, said camera captures a video image; and,
a remote station that has a monitor that displays an alert input that can be selected to request access to said robot, said access is not provided to said remote station unless a recipient user grants said request to access said robot.

2. The system of claim 1, wherein said remote station receives the video image from said robot in response to a user input at said robot.

3. The system of claim 2, wherein said robot includes a microphone, said remote station includes a speaker that receives audio from said robot.

4. The system of claim 1, wherein said alert input generates a sound at said robot.

5. The system of claim 1, wherein said alert input generates a visual prompt on said robot monitor.

6. The system of claim 5, wherein said visual prompt is a graphical icon.

7. The system of claim 1, wherein said alert input is generated from a graphical icon of a graphical user interface displayed on said remote station monitor.

8. The system of claim 7, wherein said graphical icon has an appearance of a door knocker.

9. The system of claim 7, further comprising a graphical icon that has an appearance of a horn.

10. The system of claim 1, wherein said robot includes a mobile platform.

11. A method for accessing a robot, comprising:
selecting an alert input icon displayed at a remote station monitor;
transmitting an alert input from the remote station to a robot to request access to the robot;
granting the request for access to the robot; and,
not providing access to the robot to the remote station unless said request is granted.

12. The method of claim 11, further comprising inputting a user input before transmitting the video image from the robot to the remote station.

13. The method of claim 12, further comprising transmitting audio from the robot to the remote station.

14. The method of claim 11, wherein the alert input generates a sound at the robot.

15. The method of claim 11, wherein the alert indicator generates a visual prompt on a robot monitor.

16. The method of claim 15, wherein the visual prompt is a graphical icon.

17. The method of claim 11, wherein the alert input is generated from a graphical icon of a graphical user interface.

18. The method of claim 17, wherein the graphical icon has an appearance of a door knocker.

19. The method of claim 17, further comprising generating a sound at the robot by selecting a graphical icon that has an appearance of a horn.

20. The method of claim 11, further comprising moving the robot through control commands from the remote station.

* * * * *